(12) United States Patent
Khormi et al.

(10) Patent No.: US 9,824,489 B2
(45) Date of Patent: Nov. 21, 2017

(54) GRADING AND MONITORING OF A GEOGRAPHICAL REGION

(71) Applicant: UMM AL-QURA UNIVERSITY, Makkah (SA)

(72) Inventors: Hassan M. Khormi, Jazan (SA); Majid Saeed Almaraashi, Jeddah (SA)

(73) Assignee: Umm Al-Qura University, Makkah (SA)

( * ) Notice: Subject to any disclaimer, the term of this patent is extended or adjusted under 35 U.S.C. 154(b) by 0 days.

(21) Appl. No.: 14/413,344

(22) PCT Filed: Nov. 5, 2014

(86) PCT No.: PCT/IB2014/002356
§ 371 (c)(1),
(2) Date: Jan. 7, 2015

(87) PCT Pub. No.: WO2016/071725
PCT Pub. Date: May 12, 2016

(65) Prior Publication Data
US 2016/0125645 A1 May 5, 2016

(51) Int. Cl.
*G06T 17/05* (2011.01)
*G06K 9/00* (2006.01)
*G06N 7/02* (2006.01)
*G06K 9/46* (2006.01)

(52) U.S. Cl.
CPC ............ *G06T 17/05* (2013.01); *G06K 9/0063* (2013.01); *G06K 9/4604* (2013.01); *G06N 7/02* (2013.01); *G06T 2207/10036* (2013.01); *G06T 2207/20084* (2013.01); *G06T 2207/30184* (2013.01); *G06T 2207/30188* (2013.01)

(58) Field of Classification Search
None
See application file for complete search history.

(56) References Cited

U.S. PATENT DOCUMENTS 7,400,700 B2   7/2008   Keaton et al.
8,606,518 B2   12/2013  Coombes et al.
2013/0230257 A1  9/2013  Brun et al.

OTHER PUBLICATIONS

Shi, Jiao, et al. "Change detection in synthetic aperture radar images based on fuzzy active contour models and genetic algorithms." Mathematical Problems in Engineering 2014 (2014).*

(Continued)

*Primary Examiner* — Vikkram Bali
*Assistant Examiner* — Tracy Mangialaschi
(74) *Attorney, Agent, or Firm* — Oblon, McClelland, Maier & Neustadt, L.L.P.

(57) ABSTRACT

A grading and monitoring system that evaluates a quality of index of a neighborhood via satellite images in described. The system utilizes a fuzzy-logic rule based technique in determining the quality of the neighborhood. The crisp input parameters that define the characteristics of a neighborhood are first fuzzified and based on a set of rules that are obtained from an experts knowledge, an output fuzzy set of type-2 is obtained. Further, the output fuzzy set is aggregated and type-reduced to obtain an output crisp value corresponding to the neighborhoods quality. The system also monitors changes in the neighborhood quality in predetermined time intervals.

18 Claims, 12 Drawing Sheets

(56) References Cited

OTHER PUBLICATIONS

Lucas, Richard, et al. "Rule-based classification of multi-temporal satellite imagery for habitat and agricultural land cover mapping." ISPRS Journal of photogrammetry and remote sensing 62.3 (2007): 165-185.*

Keramitsoglou, Iphigenia, et al. "Heat wave hazard classification and risk assessment using artificial intelligence fuzzy logic." Environmental monitoring and assessment 185.10 (2013): 8239-8258.*

Walter, V. "Automatic classification of remote sensing data for GIS database revision." International Archives of Photogrammetry and Remote Sensing 32 (1998): 641-648.*

Di Martino, Ferdinando, and Salvatore Sessa. "Type-2 interval fuzzy rule-based systems in spatial analysis." Information Sciences 279 (2014): 199-212.*

Lucas, Luís A., Tania M. Centeno, and Myriam R. Delgado. "General type-2 fuzzy classifiers to land cover classification." Proceedings of the 2008 ACM symposium on Applied computing. ACM, 2008.*

Juang, Chia-Feng, and Kai-Jie Juang. "Reduced interval type-2 neural fuzzy system using weighted bound-set boundary operation for computation speedup and chip implementation." IEEE Transactions on Fuzzy Systems 21.3 (2013): 477-491.*

Benz, Ursula C., et al. "Multi-resolution, object-oriented fuzzy analysis of remote sensing data for GIS-ready information." ISPRS Journal of photogrammetry and remote sensing 58.3 (2004): 239-258.*

Lizarazo, Ivan. "Quantitative land cover change analysis using fuzzy segmentation." International Journal of Applied Earth Observation and Geoinformation 15 (2012): 16-27.*

Mert, Zeynep Gamze, and Serhat Yilmaz. "Fuzzy modeling approach based on property location quality for grading neighborhood level of family housing units." Expert Systems with Applications 36.2 (2009): 3603-3613.*

Yaşar, Ali, and Şükran Yalpir. "To Use Fuzzy Logic Approach for Valuation of the Parcel." Sep. 2014 Conference Paper.*

Walter, V., "Automatic Classification of Remote Sensing Data for GIS Database Revision", IAPRS, vol. 32, pp. 641-648, Part 4 "GIS-Between Visions and Applications", Stuttgart, http://citeseerx.ist.psu.edu/viewdoc/doenload?doi=10.1.1.17.3610&rep=rep1&type=pdf, 1998.

Mert, Z. G., et al., "A Comparison of Grading Models for Neighborhood Level of Family Hausing Units", (13 Pages) http://ideas.repec.org/p/wiw/wiwrsa/ersa11p966.html, (Sep. 2011).

Zheng, D. et al., "Fuzzy Rule Extraction from GIS Data with a Neural Fuzzy System for Decision Making", pp. 79-84, http://citeseerx.ist.psu.edu/viewdoc/download?doi=10.1.1.99.1282&rep=rep1&type=pdf, 1999.

International Search Report and Written Opinion dated Jun. 30, 2015 in PCT/IB2014/002356.

Jiao Shi, et al., "Change Detection in Synthetic Aperture Radar Images Based on Fuzzy Active Contour Models and Genetic Algorithms" Mathematical Problems in Engineering, XP055197395, Apr. 9, 2014, 15 Pages.

Ursula C. Benz, et al., "Multi-resolution, object-oriented fuzzy analysis of remote sensing data for GIS-ready information" ISPRS Journal of Photogrammetry & Remote Sensing, vol. 58, XP027189327, 2004, pp. 239-258.

Richard Lucas, et al., "Rule-based classification of multi-temporal satellite imagery for habitat and agricultural land cover mapping" ISPRS Journal of Photogrammetry & Remote Sensing, vol. 62, XP022153452, 2007, pp. 165-185.

* cited by examiner

GRADING AND MONITORING OF A GEOGRAPHICAL REGION

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Specific information of a geographical region within a city or a district provides valuable insight as to the socio-economic conditions of the region. For instance, obtaining information of a disaster struck region may provide information as to the amount of financial loss incurred and the extent of rebuilding required in the region. Hygiene conditions of a region may provide valuable insight as to the occurrences of common diseases in the region and further provide necessary steps that need to be taken in order to circumvent or reduce the occurrences of such diseases. As another example, obtaining information of different regions within a city may enable policy/decision makers to make an appropriate decision as to the amount of public/government funds to be allocated in the improvement of the particular region.

However, in some developing countries, there is an absence of spatially explicit detailed neighborhood information. This occurs primarily due to financial reasons, the amount of area to be covered, time restrictions, continuous changes in the neighborhood, or the like. A naïve approach of obtaining statistical information of a particular region is by way of conducting a survey. This approach however, tends to be time consuming and often results in insufficient data collection of a particular region due to the unwillingness in survey participation due to cultural or personal reasons.

Accordingly, a technique of obtaining neighborhood (region) information in a cost/time effective and unobtrusive manner is required that may enable policymakers, community organizations, planning divisions to better serve the communities.

SUMMARY

The present disclosure describes a system and a method of evaluating and grading the quality of a neighborhood (region) using satellite images of the neighborhood. Upon obtaining a satellite image of a region, the system classifies regions in the image using a maximum likelihood technique. The system further recognizes objects in the classified image that are to be represented as inputs in a grading and evaluation process. The evaluation and grading of the neighborhood is based on a type-2 fuzzy logic rule based mechanism that evaluates and determines a level of neighborhood quality without human intervention. Further, the system monitors previously evaluated regions and compares the evaluation to a current evaluation, in order to determine a degree of change in the neighborhood quality. The monitoring of the neighborhood quality index provides beneficial applications to policy makers, military organizations, municipalities, planning departments, and the like to improve the quality of the region.

According to one embodiment, there is provided a method of evaluating and monitoring a geographical region using an image of the geographical region captured by a satellite, the method includes: recognizing by the circuitry, a plurality of objects within the received image; computing by the circuitry, parameter values for a predetermined number of parameters based on boundaries of the recognized objects in the image; mapping, for each predetermined parameter, the parameter value to a first interval type-2 fuzzy set corresponding to the parameter; determining at least one rule from a plurality of rules that is activated based on the mapped parameter values to their corresponding first interval type-2 fuzzy sets; calculating by circuitry, for each activated rule, a second interval type-2 fuzzy set corresponding to a quality index of the geographical region; combining by circuitry, the calculated second interval type-2 fuzzy sets to obtain a third interval type-2 fuzzy set corresponding to an overall quality index of the geographical region; and monitoring the geographical region after a predetermined time interval to detect a change in the overall quality index of the geographical region.

In another embodiment, there is provided a device to evaluate and monitor a geographical region by using an image of the geographical region captured by a satellite, the device includes circuitry that is configured to: recognize a plurality of objects within the received image; compute parameter values for a predetermined number of parameters based on boundaries of the recognized objects in the image; map, for each predetermined parameter, the parameter value to a first interval type-2 fuzzy set corresponding to the parameter; determine at least one rule from a plurality of rules that is activated based on the mapped parameter values to their corresponding first interval type-2 fuzzy sets; calculate, for each activated rule, a second interval type-2 fuzzy set corresponding to a quality index of the geographical region; combine the calculated second interval type-2 fuzzy sets to obtain a third interval type-2 fuzzy set corresponding to an overall quality index of the geographical region; and monitor the geographical region after a predetermined time interval to detect a change in the overall quality index of the geographical region.

According to another embodiment, there is provided a non-transitory computer-readable medium having stored thereon a program that, when executed by a computer, causes the computer to execute a method of evaluating and monitoring a geographical region using an image of the geographical region captured by a satellite, the method includes: recognizing by the circuitry, a plurality of objects within the received image; computing by the circuitry, parameter values for a predetermined number of parameters based on boundaries of the recognized objects in the image; mapping, for each predetermined parameter, the parameter value to a first interval type-2 fuzzy set corresponding to the parameter; determining at least one rule from a plurality of rules that is activated based on the mapped parameter values to their corresponding first interval type-2 fuzzy sets; calculating by circuitry, for each activated rule, a second interval type-2 fuzzy set corresponding to a quality index of the geographical region; combining by circuitry, the calculated second interval type-2 fuzzy sets to obtain a third interval type-2 fuzzy set corresponding to an overall quality index of the geographical region; and monitoring the geographical region after a predetermined time interval to detect a change in the overall quality index of the geographical region.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
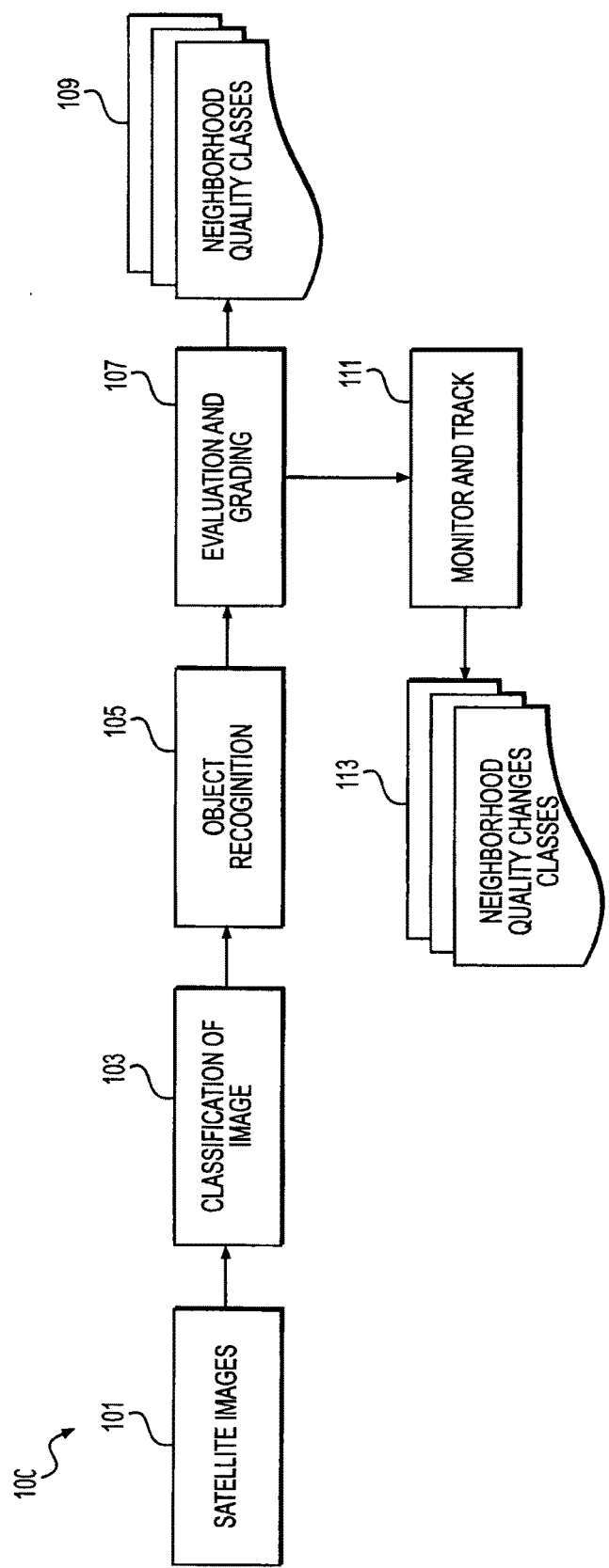
FIG. 1 illustrates according to an example, a neighborhood evaluation and grading system.

FIG. 1 illustrates according to an example, a neighborhood evaluation and grading system 100. The system includes a receiver or a GPS interface that is configured to communicate with a satellite(s). The system receives satellite images 101 of a particular region whose quality is to be determined.

The system includes a classification unit 103 that classifies regions in the received image. Image classification is performed in order to make sense of the landscape. Specifically, portions of the images are placed into categories (also referred to herein as classes). The classes may be defined based on the user application or apriori knowledge of the area. For instance, portions of the images may be classified into an agricultural area, water area, community, forest land and the like. Classifying the images provides context of the images that prove to be helpful in landscape planning or assessment projects.

According to an embodiment, the technique of classifying the image may be supervised or unsupervised. Unsupervised classification does not require a prior knowledge of the region under consideration, whereas supervised classification needs prior knowledge of the region. The process of gaining this prior knowledge is known as ground-truthing. The ground-truths (or signatures) can be obtained from existing maps or by conducting field-work in the study areas. The techniques for image classification utilize the radiometric properties of a remote sensor (such as a heat sensor) to classify objects having different spectral signatures into various classes.

According to one embodiment, image classification is performed in a supervised manner according to a maximum likelihood (ML) method. The ML method is based on the probability that a pixel belongs to a particular class. The basic theory assumes that these probabilities are equal for all classes, and that the input bands have normal distributions. Specifically, the ML method is a supervised classification method derived from the Bayes theorem, which states that the a posteriori distribution $P(i|\omega)$, i.e., the probability that a pixel with feature vector $\omega$ belongs to class i, is given by:

$$P(i|\omega) = \frac{P(\omega|i)P(i)}{P(\omega)} \tag{1}$$

where $P(\omega|i)$ is the likelihood function, $P(i)$ is the a priori information, i.e., the probability that class i occurs in the study area and $P(\omega)$ is the probability that $\omega$ is observed, which can be written as:

$$P(\omega) = \Sigma_{i=1}^{M} P(\omega|i)P(i) \tag{2}$$

where M is the number of classes. Note that $P(\omega)$ is often treated as a normalization constant to ensure $\Sigma_{i=1}^{M} P(i|\omega)$ sums up to one. Further, pixel X is assigned to class I by the following rule:

$$X \in i \text{ if } P(i|\omega) > P(j|\omega) \text{ for all } j \neq i \tag{3}$$

Upon classifying the regions in the captured image, the object recognition unit 105 recognizes objects from the captured satellite image. According to an embodiment, the object recognition unit is configured to recognize objects such as houses, streets, gardens, pools, rivers and the like. The recognition unit unveils the most likely type of object using, for instance, an artificial neural network (ANN).

An ANN is an information processing paradigm that is inspired by the way biological nervous systems, such as the brain, process information. The key element of this paradigm is a novel structure of the information processing system. It is composed of a large number of highly interconnected processing elements (neurons) working in unison to solve a specific problem. ANNs, like people, learn by example. An ANN is configured for a specific application, such as pattern recognition or data classification, through a learning process. Learning in biological systems involves adjustments to the synaptic connections that exist between the neurons. This is true of ANNs as well. Neural networks are able to derive output classes from complicated or imprecise data that can be used to extract patterns and detect trends that are too complex to be noticed by humans.

The object recognition unit automatically extracts objects from satellite images and then groups them based on their size in order of the evaluation parameters such as house size, that are used by the evaluation unit 107. In order to derive neighborhood quality information, an understanding of the meaningful image objects and their mutual relations is required. Therefore, a process for successful image object recognition is to partition images into sets of useful image objects. Thus, according to one embodiment of the present disclosure, object recognition is performed based on a set of color or grey-level extrude local patches. Specifically, the object recognition is based on shape recognition as well as edge-based features. An edge descriptor is used to complement texture based patch descriptors. Therefore, objects are represented by a fitting combination of texture and edge descriptors. Different objects from images e.g. houses, roads, etc., can be recognized by the object recognition unit 105. According to one embodiment, in order to evaluate the quality of a region (neighborhood), the objects recognized are streets, houses, etc., which are used as inputs to the evaluation and grading unit 107.

The evaluation and grading unit 107 evaluates and grades the level of neighborhood quality by utilizing a fuzzy logic system of type-2. Fuzzy logic is a form of many-valued logic that deals with reasoning that is approximate rather than fixed and exact. Compared to traditional binary sets (where variables may take on true or false values), fuzzy logic variables may have a truth value that ranges in degree between 0 and 1. Fuzzy logic has been extended to handle the concept of partial truth, where the truth value may range between completely true and completely false.

Typically used bivalent logic uses the Boolean operators AND, OR, and NOT to perform the intersect, union and complement operations. These operators work well for bivalent sets and can be essentially defined using the following truth table:

| x | y | x AND y | x OR y | NOT x |
|---|---|---------|--------|-------|
| 0 | 0 | 0 | 0 | 1 |
| 0 | 1 | 0 | 1 | 1 |
| 1 | 0 | 0 | 1 | 0 |
| 1 | 1 | 1 | 1 | 0 |

The truth table above works fine for bivalent logic but fuzzy logic does not have a finite set of possibilities for each input, which in turn requires an infinitely large truth table. The operators need to be defined as functions for all possible fuzzy values, that is, all real numbers from 0 to 1 inclusive. Fuzzy logic is a superset of bivalent logic since it includes the bivalent options (0, 1) as well as all reals in between, so a generalized form of these operators is useful. According to an embodiment, the generalized form for these three operators can be expressed as:

| x AND y | min(x, y) |
| x OR y  | max(x, y) |
| NOT x   | 1 − x     |

The above definitions can be applied to all of the bivalent combinations above as well as fuzzy number combinations. For instance, a truth table for the above rules can be depicted as:

| x | y | min(x, y) | max(x, y) | 1 − x |
|---|---|-----------|-----------|-------|
| 0 | 0 | 0 | 0 | 1 |
| 0 | 1 | 0 | 1 | 1 |
| 1 | 0 | 0 | 1 | 0 |
| 1 | 1 | 1 | 1 | 0 |
| 0.2 | 0.5 | 0.2 | 0.5 | 0.8 |
| 0.7 | 0.2 | 0.2 | 0.7 | 0.3 |
| 0.6 | 0.6 | 0.6 | 0.6 | 0.4 |

Note that the behavior of the new generalized definitions of AND, OR and NOT can be applied for all possible inputs of x and y. Furthermore, mathematical definitions of the AND operator are referred to as triangular norms or t-norms which are defined herein as a binary operator with both operand and the result in [0, 1]. The mathematical definitions of the OR operator have all the same properties of t-norms except that they have zero as an identity and are referred to herein as t-conorms. The NOT operator can also be redefined as long as it is a continuous and has a strictly decreasing function within the range [0, 1]. Accordingly, a combining operation for a predetermined number of fuzzy sets can include a maximum (t-norm) operation or a minimum (t-conorm) operation.

Generally, in any city or district, there are a number of variables that determine city or district quality. Some factors that determine the quality of a neighborhood include house size, street width and number of houses per square area and the like. The street width can be computed from the recognized objects by determining the distance between the edges of houses on opposite sides. In order to determine the quality of the neighborhood, a set of parameters are input into the evaluation and grading unit. According to one embodiment, a predetermined number of parameters may be input to the fuzzy logic system to determine the neighborhood quality. In the present embodiment, the parameters used to determine neighborhood quality are street width, house size and number of houses in a specific predetermined area. Note that the wealthier areas have the following neighborhood features: wider streets, high number of gardens, pools and the houses are farther away from street curbs, whereas the poorer areas have narrower streets, very low number of gardens and the houses are closer to the street curbs. Furthermore, in poorer neighborhoods the number of houses in a given land area is higher, the house sizes are smaller, and the houses are closer together. In contrast, in wealthier neighborhoods, the number of houses in a given land area is lower than that in poorer neighborhoods, the house sizes are bigger, and the houses are widely separated.

Figure 3A:
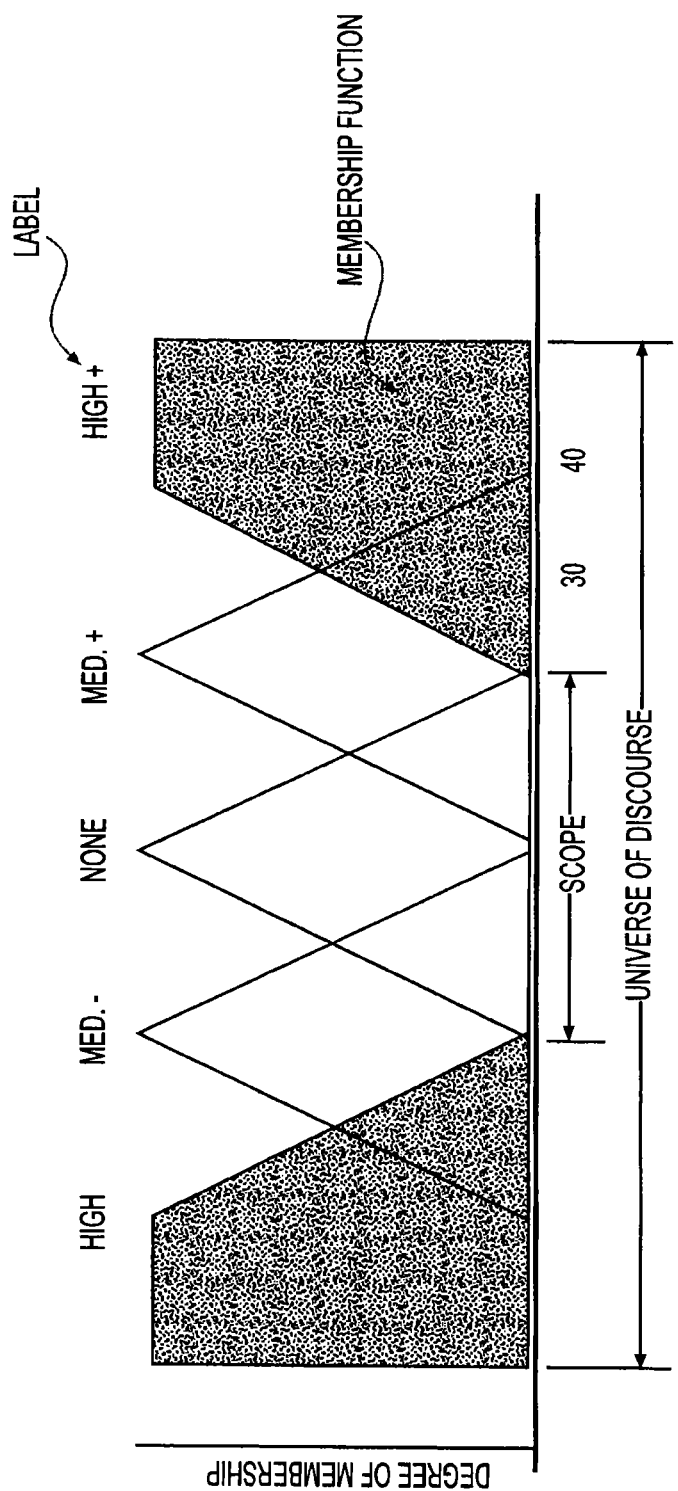
FIG. 3A depicts according to an example, a structure of a membership function.
Figure 3B:
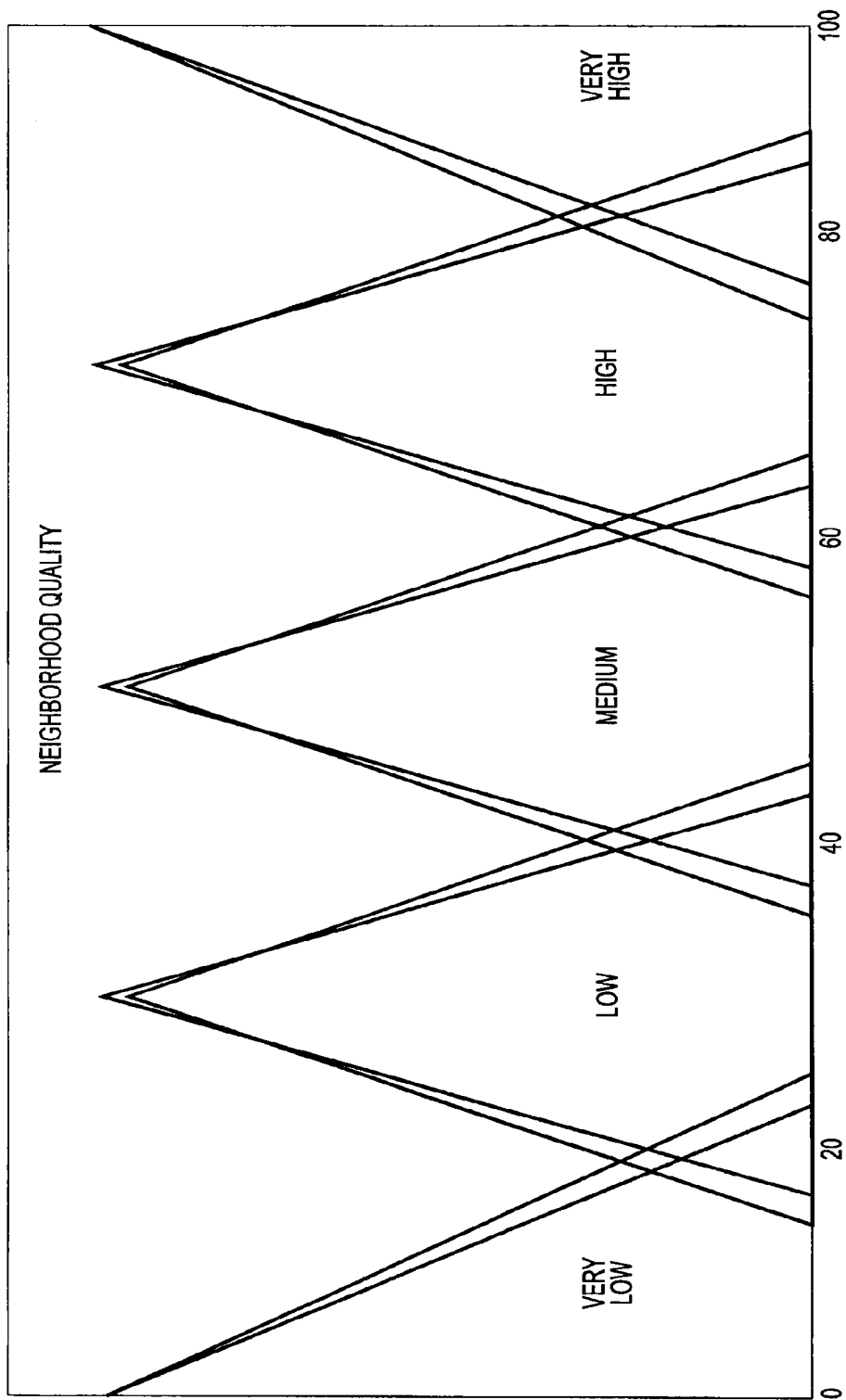
FIG. 3B depicts according to an example, a type-2 fuzzy set for an output parameter (neighborhood quality) of the fuzzy logic system.

In the present embodiment, a set of three parameters is considered in the fuzzy logic system. The parameters are street width (SW), house size (HS) and number of houses (NOH). The parameters are assumed to be one of low (L), medium (M) and high (H). Thus, there are a total of 27 rules as shown in Table I, which represent all the combinations of the three inputs. Specifically, each parameter is assigned a level (out of a predetermined number of K levels). Thus, for a system with P parameters and K levels (for each parameter), the total number of rules (R) is a product of the number of parameters and the number of levels (i.e., R=P*K). Further, for the three inputs and their corresponding values, a neighborhood quality index (NQI) can be classified into one of five grades: very low (VL), low (L), medium (M), high (H), and very high (VH). For instance, FIG. 3B depicts an output fuzzy set for the neighborhood quality index. Note that the neighborhood quality index is captured from expert's knowledge transformed into fuzzy rules. A computation of a neighborhood quality index based on a set of rules is described later with reference to FIG. 6.

TABLE I

Extracted Fuzzy Rules

| If | SW | Is | L | and | HS | is | M | and | NOH | is | L | Then | NQI | is | M |
| If | SW | Is | L | and | HS | is | M | and | NOH | is | M | Then | NQI | is | M |
| If | SW | Is | L | and | HS | is | M | and | NOH | is | H | Then | NQI | is | L |

TABLE I-continued

Extracted Fuzzy Rules

| | | | | | | | | | | | | | |
|---|---|---|---|---|---|---|---|---|---|---|---|---|---|
| If | SW | Is | L | and | HS | is | H | and | NOH | is | L | Then | NQI | is | H |
| If | SW | Is | L | and | HS | is | H | and | NOH | is | M | Then | NQI | is | M |
| If | SW | Is | L | and | HS | is | H | and | NOH | is | H | Then | NQI | is | L |
| IF | SW | Is | L | and | HS | is | L | and | NOH | is | L | Then | NQI | is | M |
| If | SW | Is | L | and | HS | is | L | and | NOH | is | M | Then | NQI | is | M |
| If | SW | Is | L | and | HS | is | L | and | NOH | is | H | Then | NQI | is | VL |
| If | SW | Is | M | and | HS | is | L | and | NOH | is | L | Then | NQI | is | M |
| If | SW | Is | M | and | HS | is | L | and | NOH | is | M | Then | NQI | is | M |
| If | SW | Is | M | and | HS | is | L | and | NOH | is | H | Then | NQI | is | L |
| If | SW | Is | M | and | HS | is | M | and | NOH | is | L | Then | NQI | is | M |
| If | SW | Is | M | and | HS | is | M | and | NOH | is | M | Then | NQI | is | M |
| If | SW | Is | M | and | HS | is | M | and | NOH | is | H | Then | NQI | is | M |
| If | SW | Is | M | and | HS | is | H | and | NOH | is | L | Then | NQI | is | H |
| If | SW | Is | M | and | HS | is | H | and | NOH | is | H | Then | NQI | is | M |
| If | SW | Is | M | and | HS | is | H | and | NOH | is | H | Then | NQI | is | M |
| If | SW | Is | H | and | HS | is | L | and | NOH | is | L | Then | NQI | is | M |
| If | SW | Is | H | and | HS | is | L | and | NOH | is | H | Then | NQI | is | M |
| If | SW | is | H | and | HS | is | L | and | NOH | is | H | Then | NQI | is | L |
| If | SW | is | H | and | HS | is | M | and | NOH | is | L | Then | NQI | is | H |
| If | SW | is | H | and | HS | is | M | and | NOH | is | H | Then | NQI | is | M |
| If | SW | is | H | and | HS | is | M | and | NOH | is | H | Then | NQI | is | M |
| If | SW | is | H | and | HS | is | H | and | NOH | is | L | Then | NQI | is | VH |
| If | SW | is | H | and | HS | is | H | and | NOH | is | H | Then | NQI | is | H |
| If | SW | is | H | and | HS | is | H | and | NOH | is | H | Then | NQI | is | M |

Returning to FIG. 1, upon performing the evaluation and grading of a neighborhood, the results may be stored in a database (neighborhood quality class) 109. Further, the system includes a monitoring and tracking unit that tracks changes in the neighborhood quality index based on current and historical records of the neighborhood quality index for all areas that are assessed previously. The changes in the NQI for a neighborhood may be stored in a database 113 that maintains the amount of change associated with a particular neighborhood. The monitoring and tracking unit may be configured to track changes in the NQI within a predetermined time interval that corresponds to the time interval between successive satellite image captures. According to an embodiment, the difference in the change in NQI of a particular neighborhood may be classified as shown in Table II. For instance, if the change in NQI of a particular neighborhood is between min=0 and max=2, the monitoring unit may determine that there is no significant change in the quality of the neighborhood, whereas a change in the range of min=3 to max=30 corresponds to a low change in the NQI of the region under consideration.

TABLE II

Neighborhood change classes

| Class | Minimum | Maximum |
|---|---|---|
| No Change | 0 | 2 |
| Low | 3 | 30 |
| Medium | 31 | 60 |
| High | 61 | 100 |

Figure 2:
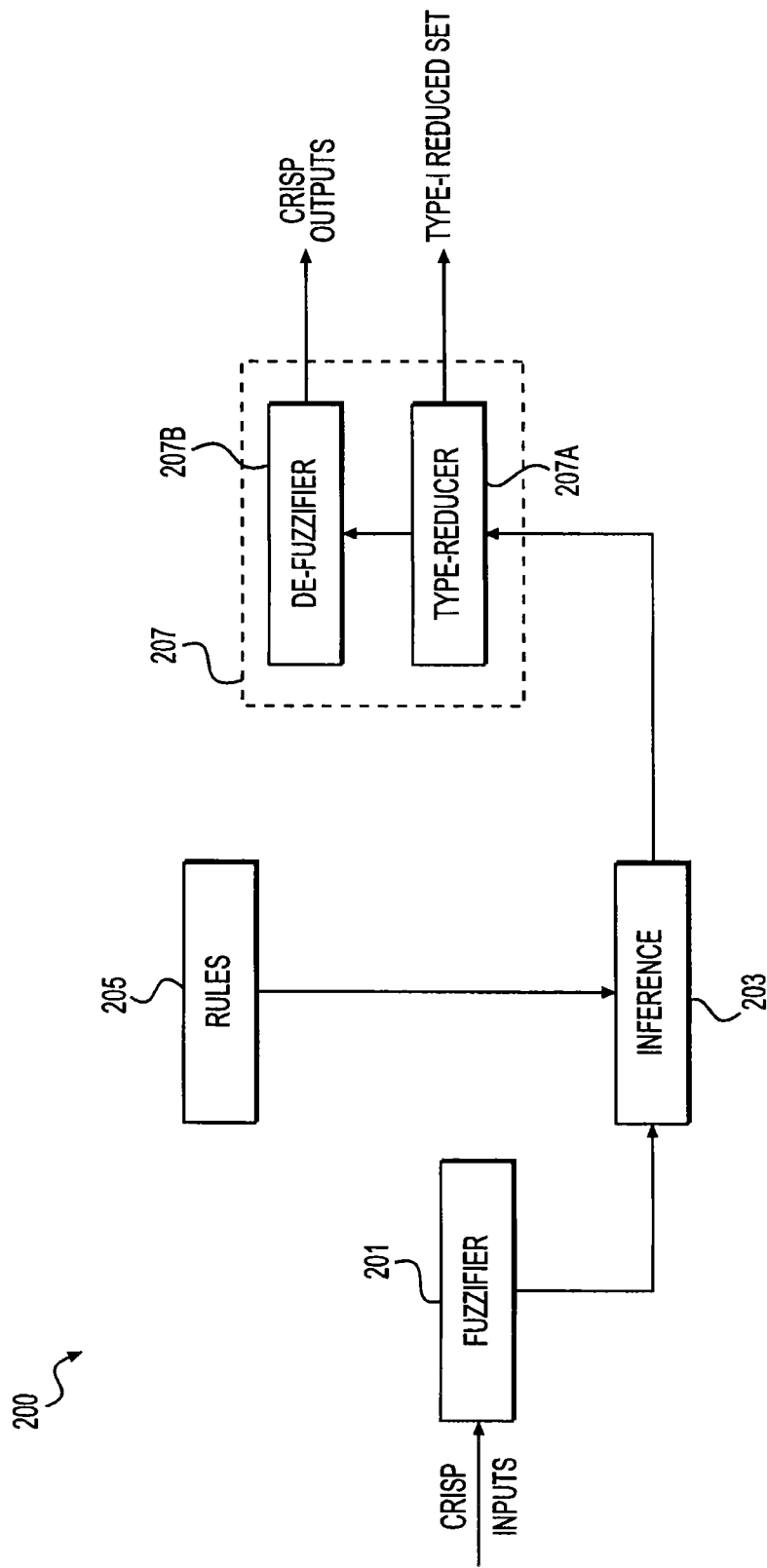
FIG. 2 illustrates according to an example, a fuzzy logic system of type-2.

FIG. 2 depicts according to an embodiment, a block diagram of type-2 fuzzy logic system (FLS). Type-2 fuzzy sets are widely applicable in rule-based FLS as they allow uncertainties to be modeled, whereas the uncertainties cannot be fully modeled by a type-1 fuzzy set. Such a FLS may be used in fuzzy logic control, fuzzy logic signal processing, rule-based classification, or the like.

The fuzzy logic system 200 in FIG. 2 includes a fuzzifier unit 201, a rules unit 205, an inference unit 203, and an output processing unit 207. The output processing unit 207 includes a type-reducer unit 207A and a de-fuzzifier unit 207B.

Figure 3C:
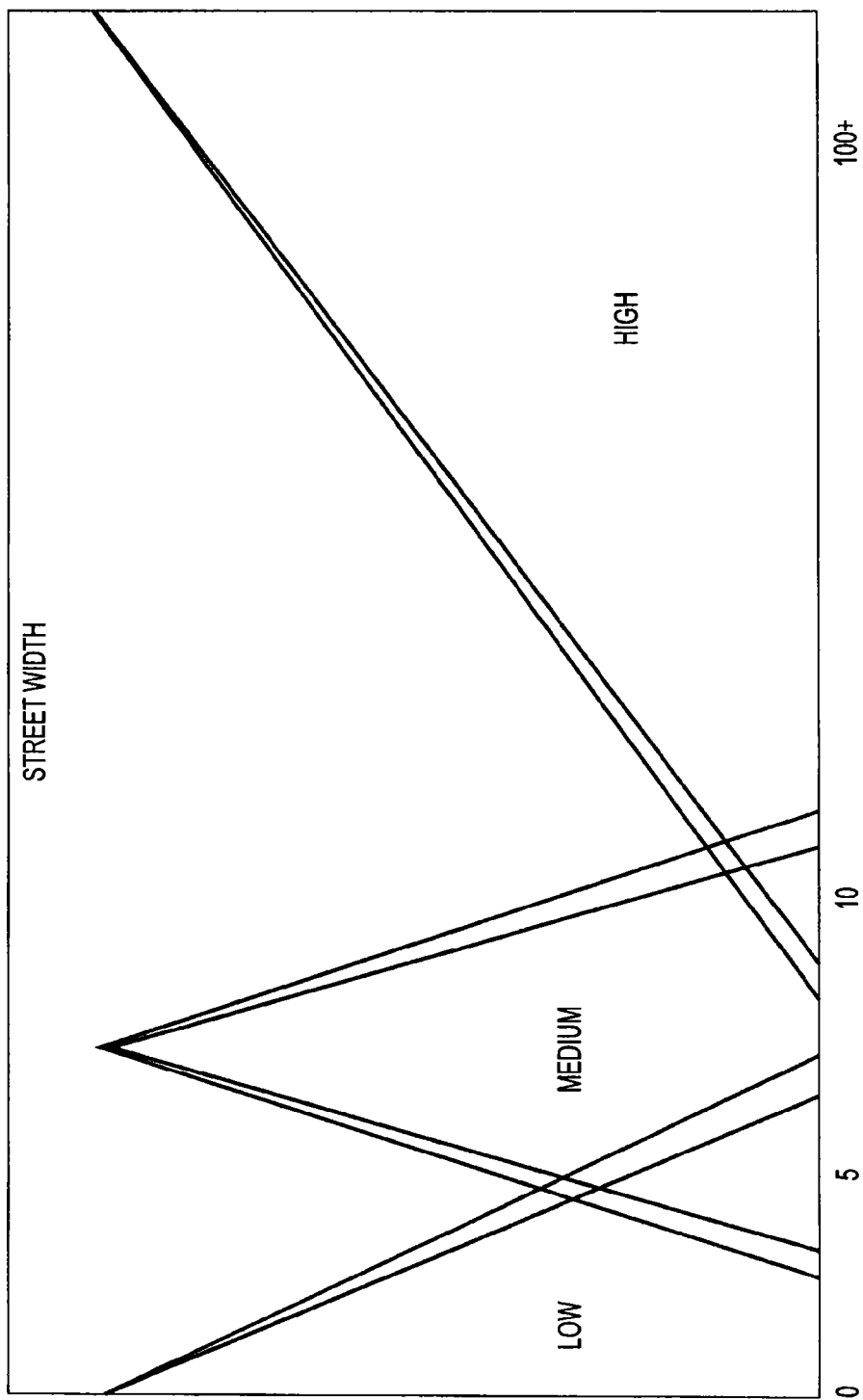
FIG. 3C depicts according to an example, a type-2 fuzzy set for input parameter street width.

In FIG. 2, the measurements of the inputs (referred to herein as crisp inputs) are transformed into a type-2 fuzzy set by the fuzzifier unit 201. The crisp inputs are converted into fuzzy sets by using appropriate membership functions (described with reference to FIG. 3A) for the input parameters under consideration. For instance, according to an embodiment of the present disclosure, an input (street width) is fuzzified by considering three sets of low, medium, and high as shown in FIG. 3C. The fuzzy sets (and not the crisp inputs) activate the rules 205 which are described in terms of fuzzy sets.

Specifically, fuzzification involves a domain transformation where crisp inputs are mapped into fuzzy inputs. Crisp inputs are exact inputs measured by sensors and passed into the system for processing, such as temperature, pressure, rpm's, etc. Each crisp input that is to be processed by the FLS has its own group of membership functions or sets to which they are mapped. This group of membership functions exists within a universe of discourse that holds all relevant values that the crisp input can possess. FIG. 3A depicts according to an embodiment, the structure of membership functions within a universe of discourse for a crisp input, wherein degree of membership is a degree to which a crisp value is compatible to a membership function value from 0 to 1, also known as truth value or fuzzy input. Membership function defines a fuzzy set by mapping crisp values from its domain to the sets associated degree of membership. Crisp inputs are distinct or exact inputs to a certain system variable, usually measured parameters external from the FLS system, e.g. 6 Volts.

A label is a descriptive name used to identify a membership function. The scope or domain is the width of the membership function, the range of concepts, usually numbers, over which a membership function is mapped and the universe of discourse is a range of all possible values, or concepts, applicable to a system variable.

When designing the number of membership functions for an input variable, labels must initially be determined for the membership functions. The number of labels correspond to the number of regions that the universe should be divided, such that each label describes a region of behavior. A scope must be assigned to each membership function that numerically identifies the range of input values that correspond to a label.

The shape of the membership function is representative of the variable. However this shape is also restricted by the computing resources available. Complicated shapes require more complex descriptive equations or large lookup tables. Furthermore, the shape of the membership function may be bell-shaped, singletons, trapezoidal or the like. Furthermore, while considering the number of membership functions to exist within the universe of discourse, one must consider that: i) too few membership functions for a given application will cause the response of the system to be too slow and fail to provide sufficient output control in time to recover from a small input change. This may also cause oscillation in the system, and ii) too many membership functions may cause rapid firing (or activation) of different rule consequents for small changes in input, resulting in large output changes, which may cause instability in the system. Furthermore, according to an embodiment, the specific shape of a member function as well as the degree of membership may be determined based on expert analysis/opinions of the system parameter under consideration.

Returning to FIG. 2, the rules unit 205 includes a set of rules that are either provided by subject experts or are extracted from numerical data. According to an embodiment, the rules are expressed as a collection of IF-THEN statements, e.g., IF temperature is moderate and pressure is high, then acceleration is high. Fuzzy sets are associated with the terms that appear in the antecedents (IF-part) or consequents (THEN-part) of rules, and with the inputs to and the outputs of the FLS. Membership functions are used to describe these fuzzy sets, and in a type-1 FLS they are all type-1 fuzzy sets, whereas in a type-2 FLS at least one membership function is a type-2 fuzzy set.

Note that for a type-2 membership function can be obtained by blurring the type-1 membership function to the right and to the left. In this case, for a specific value of the input parameter, the membership function takes different values that are not all weighed the same. Thus, a different membership grade can be assigned to all those points. In doing so, for each input parameter value, a three dimensional membership function i.e., a type-2 membership function is obtained that characterizes a type-2 fuzzy set. The membership function of a general type-2 fuzzy set is three-dimensional, where the third dimension is the value of the membership function at each point on its two-dimensional domain that is called its footprint of uncertainty (FOU). An interval type-2 fuzzy set is one wherein, the third-dimension value is the same (e.g., 1) everywhere, which means that no new information is contained in the third dimension of an interval type-2 fuzzy set. Thus, for such a set, the third dimension is ignored, and only the FOU is used to describe it. Note that the type-2 interval fuzzy set is characterized by an upper membership function value and a lower membership function value.

An interval type-2 FLS provisions for the following kinds of uncertainties to be quantified: words that are used in antecedents and consequents of rules, as words can mean different things to different people; uncertain consequents: because when rules are obtained from a group of experts, consequents will often be different for the same rule, i.e. the experts will not necessarily be in agreement; membership function parameters: because when those parameters are optimized using uncertain (noisy) training data, the parameters become uncertain; and noisy measurements: because often it is such measurements that activate the FLS.

After the measurements are fuzzified through minimum or product mathematical operators such as t-norms (minimum or product based operators), the resulting input fuzzy sets are mapped into fuzzy output sets by the inference unit 203. According to an embodiment, the mapping may be accomplished by first quantifying each rule using fuzzy set theory through t-norm operators, and by then using the mathematics of fuzzy sets to establish the output of each rule, with the help of an inference mechanism. For instance, if there are M rules then the fuzzy input sets to the inference unit 203 will activate only a subset of those rules, where the subset contains at least one rule and usually fewer than M rules. Inference is done one rule at a time. So, at the output of the Inference block, there will be one or more fired-rule fuzzy output sets.

However, in most applications of a FLS, a number (and not a fuzzy set) is needed as its final output. For instance, consider the consequence of the rule: "acceleration is a little high". This is a linguistic expression, and a magnitude for acceleration must be determined. Consequently, the output fuzzy sets have to be converted into a number. The fuzzy output sets are converted in to numbers by the output processing block 207.

According to an embodiment, the output processing block 207 may include a type-1 FLS, output processing called De-fuzzification, which maps a type-1 fuzzy set into a number. A mapping of such a nature may be performed for instance, by computing the union of the fired-rule output fuzzy sets and then computing the center of gravity of the membership function for that set, or computing a weighted average of the center of gravities of each of the fired rule consequent membership functions or the like.

For an interval type-2 FLS, the processing includes transforming an interval type-2 fuzzy set to a number by two steps. The first step is the type-reduction unit 207A, wherein an interval type-2 fuzzy set is reduced to an interval-valued type-1 fuzzy set. According to an embodiment, this type of reduction may be performed by the Karnik and Mendel (KM Algorithm). For instance, according to an embodiment, the type-reducer reduces type-2 fuzzy sets that have been produced by the inference engine to type-1 fuzzy sets by performing a centroid calculation. In other words, the center of type-2 consequent sets are replaced by a centroid which is a type-1 set and consequently a weighted average of the centroids of the sets can be computed to get a type-1 fuzzy set. More specifically, the primary variable and primary membership function of an interval type-2 FS is sampled to obtain a discretized FOU. A curve obtained by joining the centroids of the discretized FOU is a type-1 fuzzy set. The second step of the output processing 207 occurs after the type-reduction unit by a de-fuzzifer 207B, which reduces a type-1 interval set in to a crisp output number. According to an embodiment, a crisp output value can be obtained from a type-1 reduced fuzzy set by finding the centroid of the type reduced set.

Accordingly, there may be two outputs to an interval type-2 FLS: crisp numerical values and the type-reduced set. The latter provides a measure of the uncertainties that have flowed through the interval type-2 FLS, due to the (possibly) uncertain input measurements that have activated rules whose antecedents or consequents or both are uncertain. Further, just as standard deviation is widely used in probability and statistics to provide a measure of unpredictable uncertainty about a mean value, the type-reduced set can provided a measure of uncertainty about the crisp output of an interval type-2 FLS.

Figure 4A:
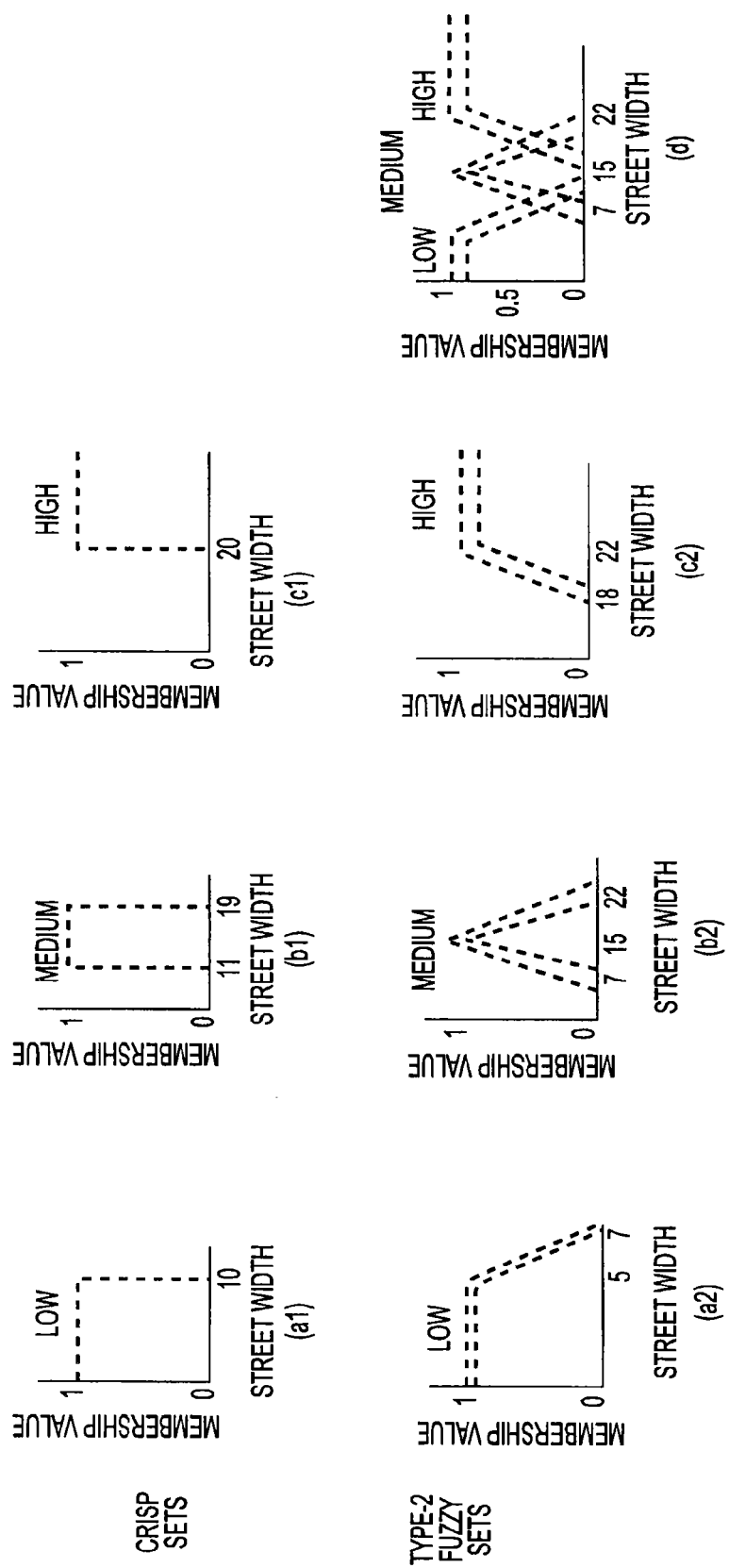
FIG. 4A depicts according to an example, crisp and fuzzy sets for the parameter street width.
Figure 4B:
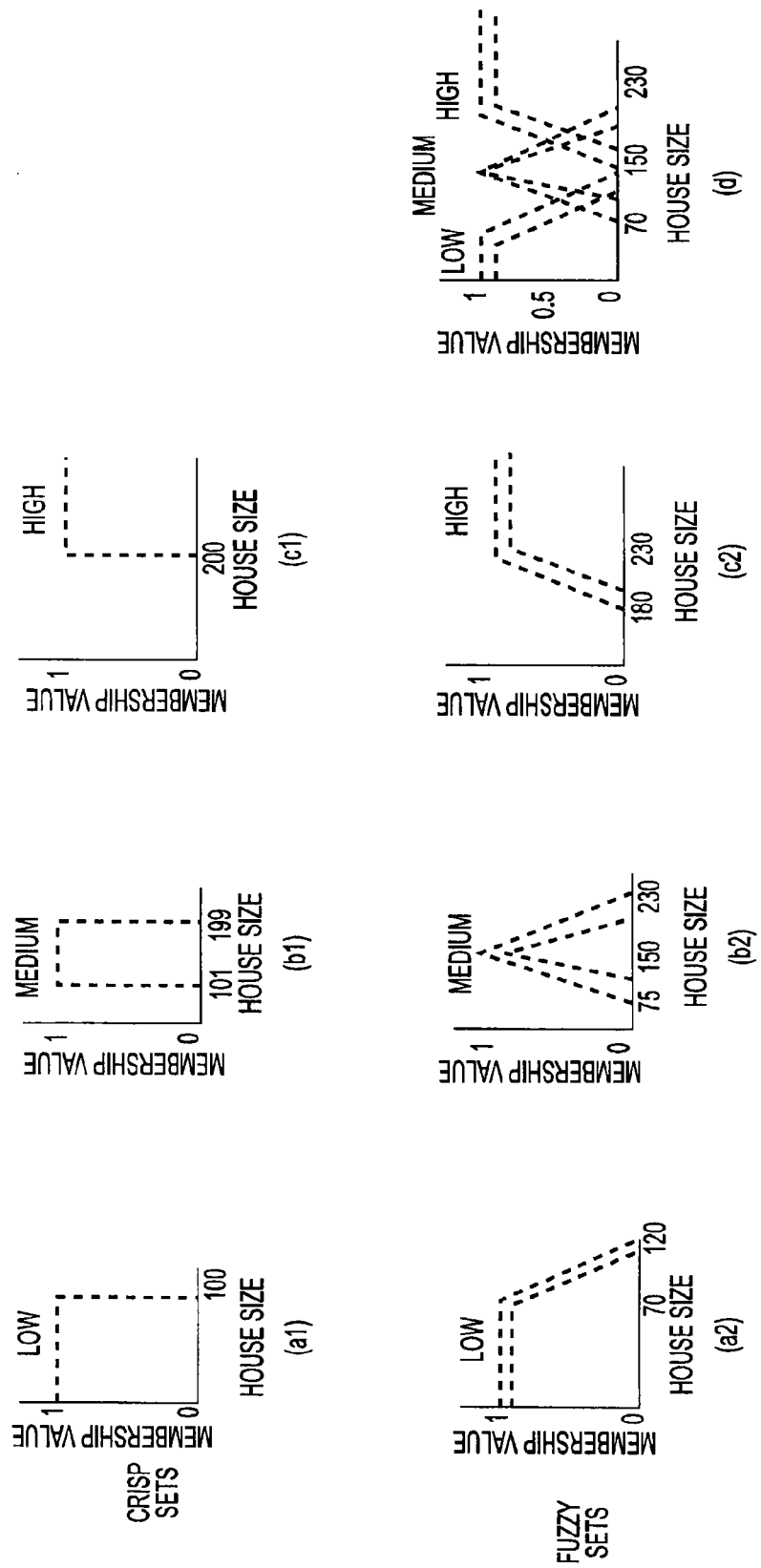
FIG. 4B depicts according to an example, crisp and fuzzy sets for the parameter house size.

FIG. 4A depicts according to an embodiment, a crisp set and a transformation of the crisp set into a fuzzy set that is performed by the fuzzifier 201 of the FLS of FIG. 2. FIG. 4A depicts the fuzzification of input parameter street width, whereas FIG. 4B depicts the transformation of input parameter house size. The graphs represented in the figure have street width plotted on the X-axis and the membership function value plotted on the Y-axis.

In FIG. 4A, the input parameter street width is categorized into low (graph a1), medium (graph b1) and high (graph c1) street widths. Specifically, the graphs represent the crisp values that the parameter street width could potentially have. For instance, a value from 0-10 (as depicted in graph a1) represents a low crisp value for the parameter street width. A corresponding type-2 fuzzy set computed by the fuzzifier 201 is defined by the membership function represented in graph a2. According to an embodiment, a type-2 fuzzy set can be determined, through an aggregation of a predetermined number of expert opinions and/or be statistically computed from raw real data. Similarly, the fuzzy sets for the medium and high crisp values are represented in graphs b2 and c2. The graph represented in (d) depicts a combination of the fuzzy-2 sets for the parameter street width. Thus, on obtaining crisp input values for a certain parameter, the fuzzifier may map the crisp input value to an interval type-2 fuzzy set that is determined based on expert knowledge.

As stated previously, FIG. 4B depicts the crisp set and the corresponding fuzzy type-2 set for the parameter house size. The transformation is similar to the technique described for the parameter street width. Accordingly a description of the transformation for the parameter house size is omitted for the sake of repetition.

Figure 5:
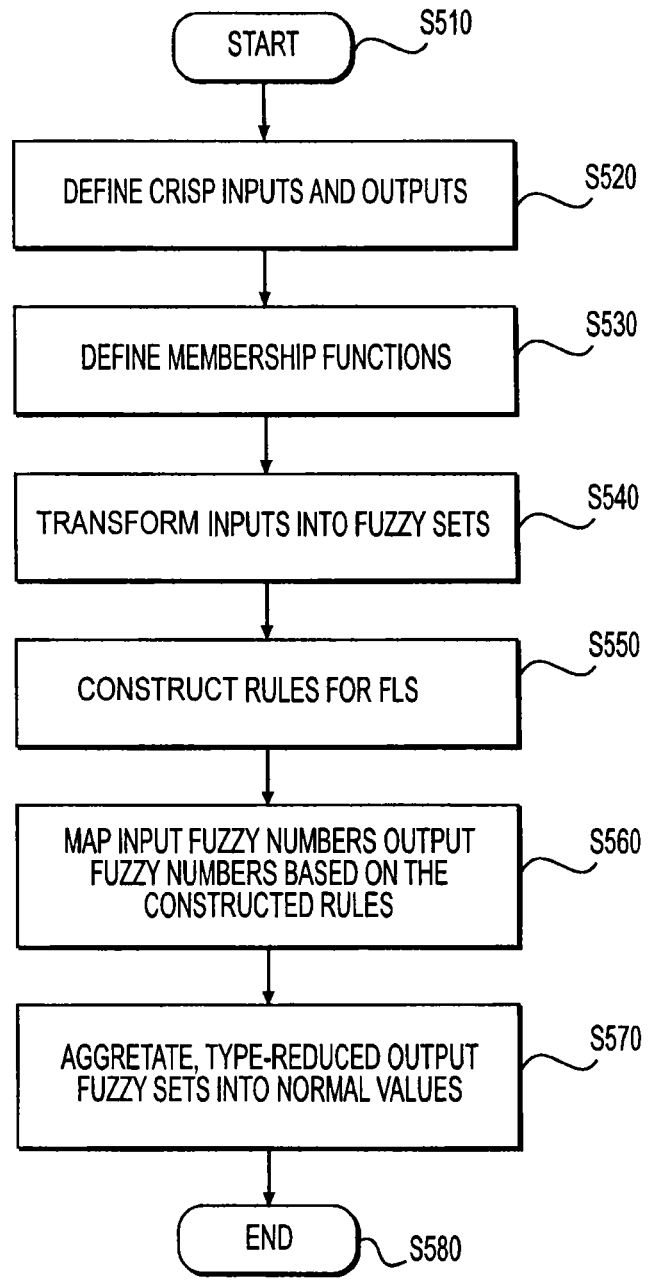
FIG. 5 illustrates a flowchart depicting the steps performed by the neighborhood evaluation system.

FIG. 5 illustrates a flowchart depicting the steps performed by the neighborhood evaluation and grading system. The process starts in step S510 and proceeds to step S520.

In step S520, the crisp inputs and the output to be evaluated and graded are defined. According to an embodiment of the present disclosure, street width, house size, and number of houses are considered to be the input parameters to the FLS. The neighborhood quality index is defined to be the output parameter that the FLS computes and monitors.

In step S530, membership functions (as described in FIG. 3A) are determined for each input parameter. Note that the membership functions determined for each input parameter encapsulate all potential values the parameter can have. For instance, according to one embodiment, the input parameters such as street width are categorized in to 'low', 'medium' and 'high' street widths. Note that the number of membership functions for each variable is based on expert opinions. For instance, based on expert's opinion, the street width may be divided into four categories (rather than three) of: very low, low, medium and high.

In step S540, the input crisp values are transformed into fuzzy sets as described with reference to FIGS. 4A and 4B.

In step S550, a set of rules is constructed, for instance, based on the experts knowledge. According to one embodiment, a set of rules as shown in Table I is constructed such that the FLS can make an inference on the transformed crisp input parameters.

In step S560, the inference unit (203 in FIG. 2) maps the transformed input fuzzy sets to output fuzzy sets based on the rules constructed in step S550.

The process then proceeds to step S570 wherein the output fuzzy sets are aggregated and type reduced by the output processing unit 207 of the FLS. Specifically, the FLS aggregates all the output fuzzy sets and reduces the type 2 fuzzy sets to a type 1 fuzzy set. Further, the type 1 fuzzy set is transformed in output crisp values. For instance, according to an embodiment, the FLS in the present disclosure transforms the output fuzzy sets into a crisp bounded output value that corresponds to the neighborhood quality index. The NQI may be bounded for instance between values 0-100, 0-1, or the like.

According to an embodiment, after computing the NQI, the process may repeat steps S540, S560, and S570 to monitor the value of the NQI in a predetermined time interval, where after the process terminates in step S580.

Figure 6:
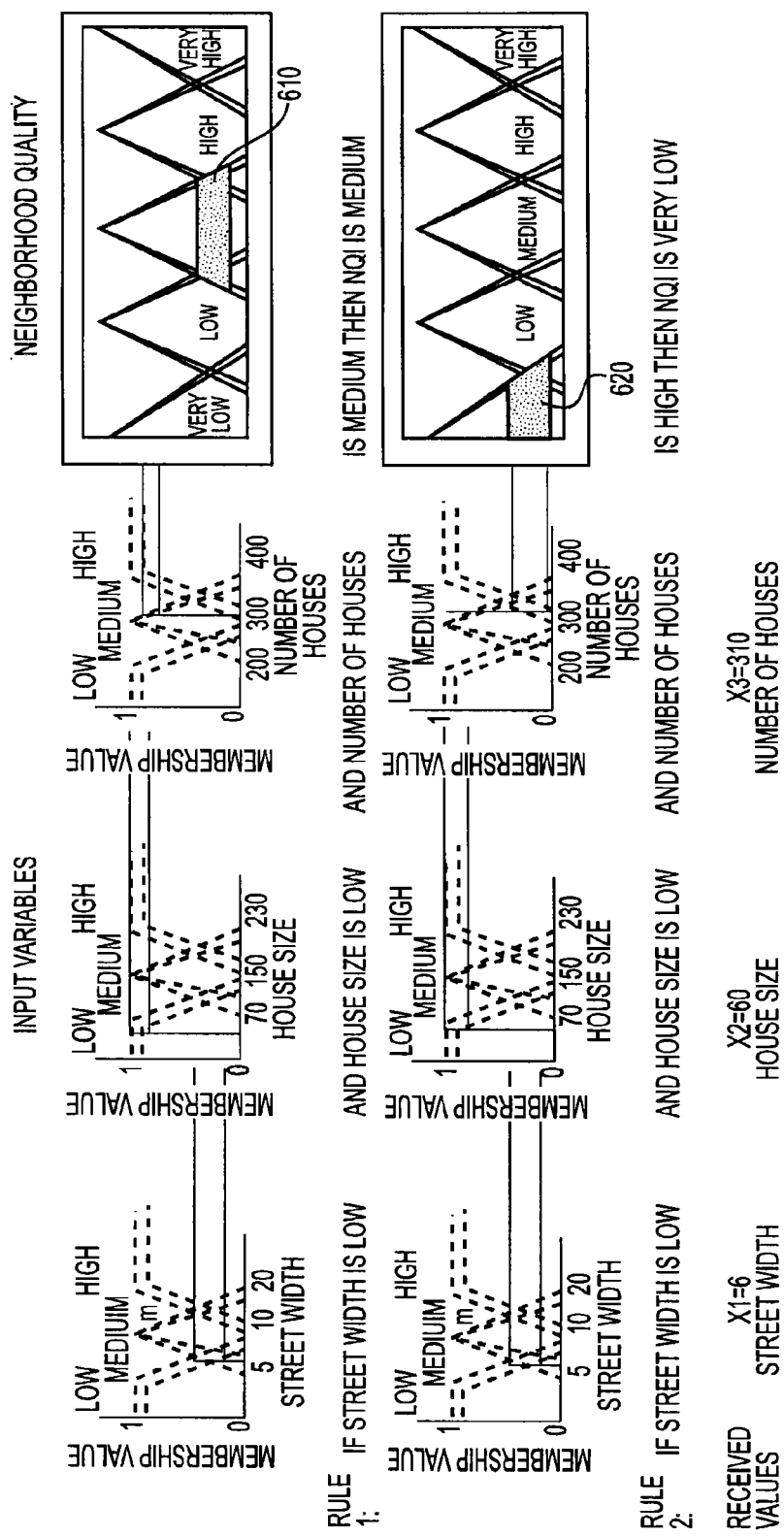
FIG. 6 illustrates an example of computing neighborhood quality index.

FIG. 6 illustrates an example of computing neighborhood quality index of a particular region. Specifically, the example as depicted in FIG. 6 depicts the output obtained after the processing of inputs by the fuzzifier 201 and inference block 203 in FIG. 2. This processing is also referred to as antecedent processing of the rules.

The rules considered in the example of FIG. 6 are Rule 1: IF street width is LOW, and house size is LOW, and the number of houses is MEDIUM, then the NQI of the region is MEDIUM. The individual areas within the fuzzy sets of the input parameters are also shown in FIG. 6. The first rule results in the NQI of the region being medium which is represented by region 610 in FIG. 6. Note that the output can be obtained by implementing a minimum t-norm operation on the corresponding interval type-2 fuzzy sets of the input parameters.

The second rule is: IF street width is LOW, and house size is LOW, and the number of houses is HIGH, the NQI of the region is VERY LOW. For the set of received values (street width=6, house size=60, and number of houses=310), corresponds to a very low NQI as represented by 620 in FIG. 6. A minimum t-norm operation can be implemented to obtain the fuzzy set of the neighborhood quality corresponding to rule 2. According to an embodiment, the set of predetermined rules must include at least two rules. Based on the crisp inputs of the parameters, a subset of the rules is activated. For instance, as shown in FIG. 6, two rules (from a total of 27 rules listed in Table 1) are activated.

Figure 7:
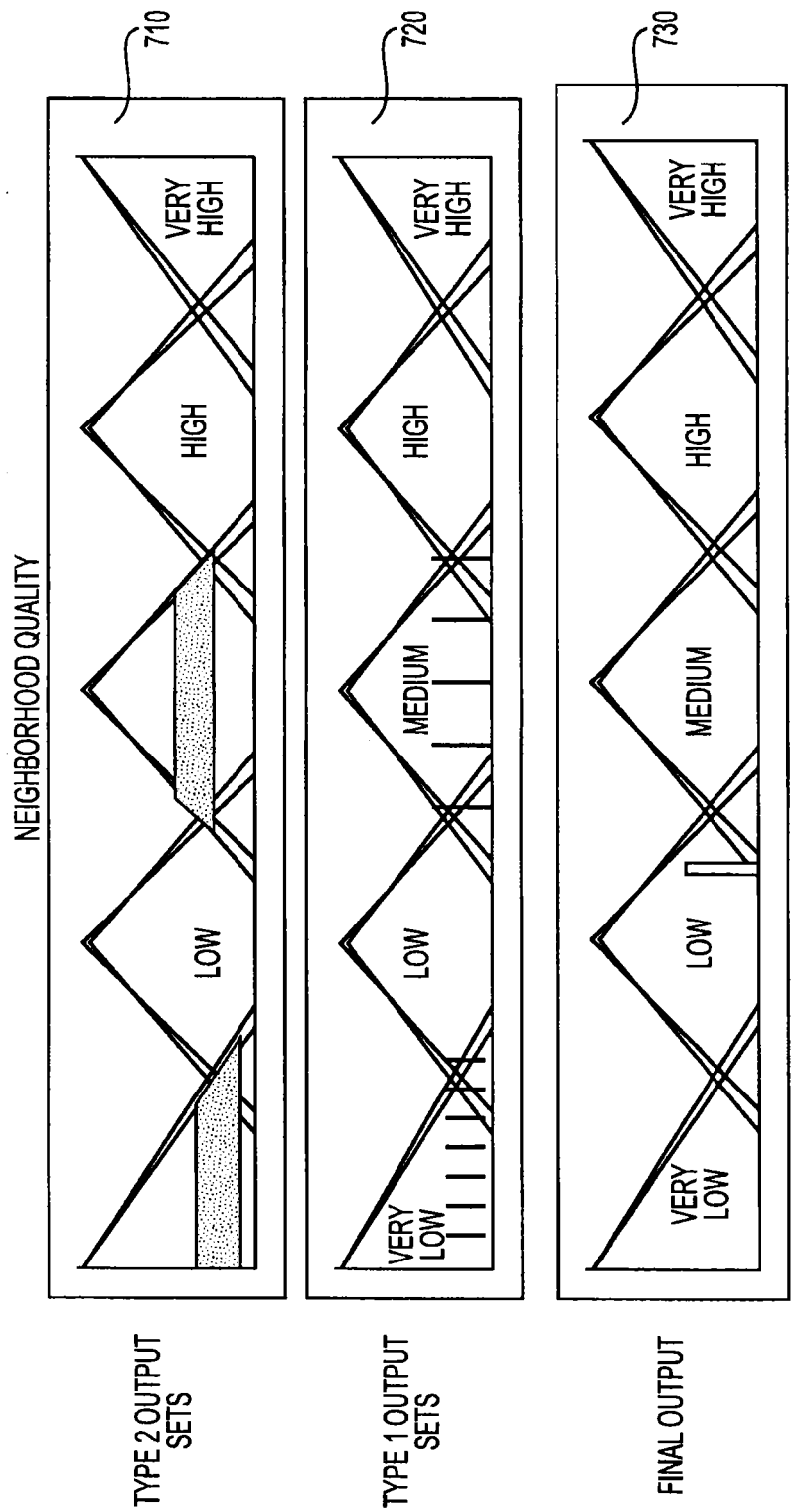
FIG. 7 is an exemplary illustration of transforming a fuzzy set output to a crisp output.

Further, according to an embodiment, upon computing the output type-2 fuzzy sets corresponding to the consequents of each activated rule and as depicted in the rightmost column of FIG. 6, the fuzzy type-2 sets are combined via a t-norm operation (maximum operation) to obtain a combined type-2 fuzzy set 710 as shown in FIG. 7. Further, as depicted in the output processing block 207 of FIG. 2, the combined type-2 fuzzy set 710 can be type reduced via the centroid method to obtain a type-1 fuzzy set 720. Furthermore, the type-1 reduced set 720 can be transformed to a crisp output 730 by computing a centroid of the type-1 reduced set.

Figure 8:
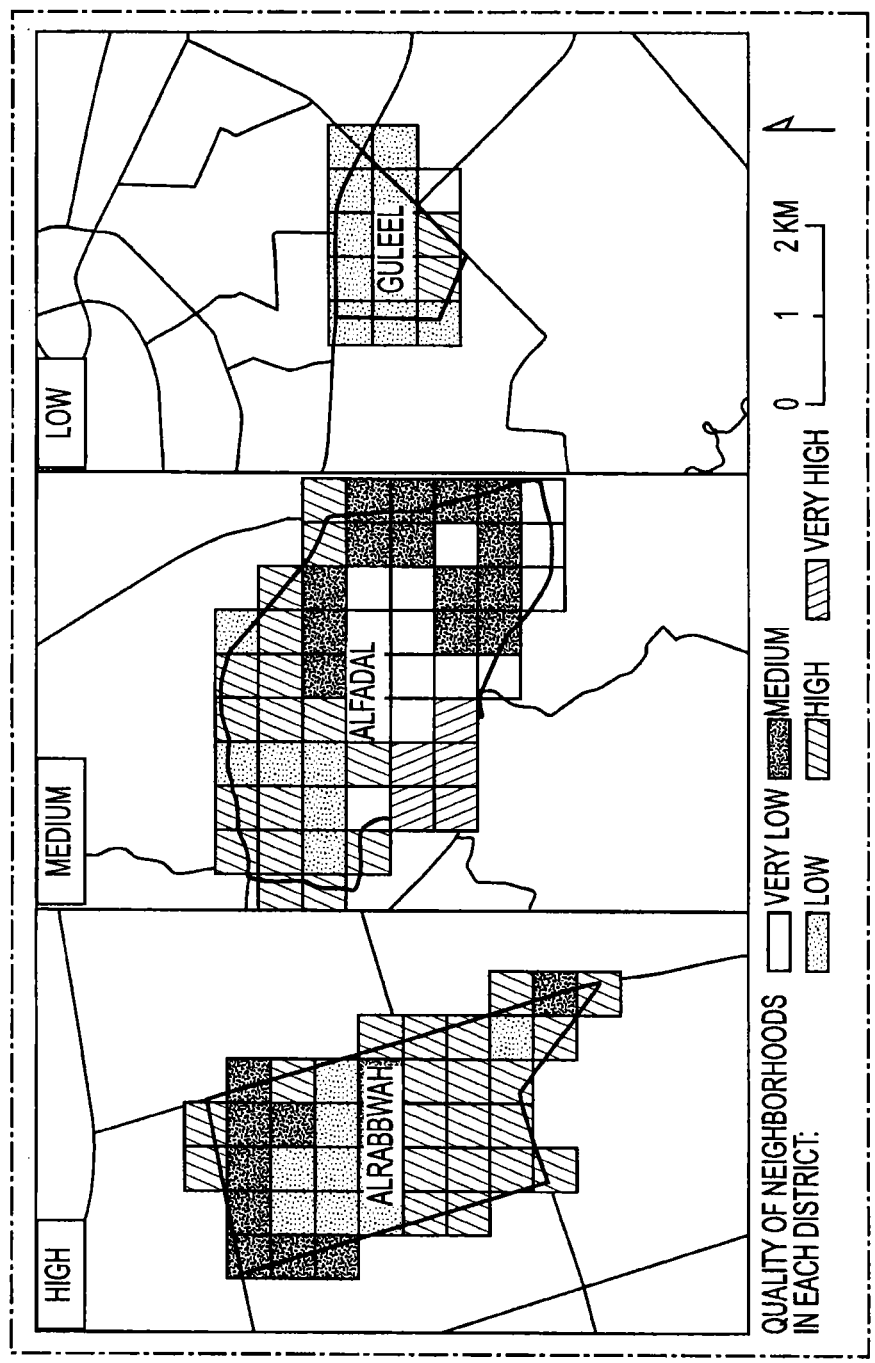
FIG. 8 depicts an example showing the neighborhood class assigned to each region.
Figure 9:
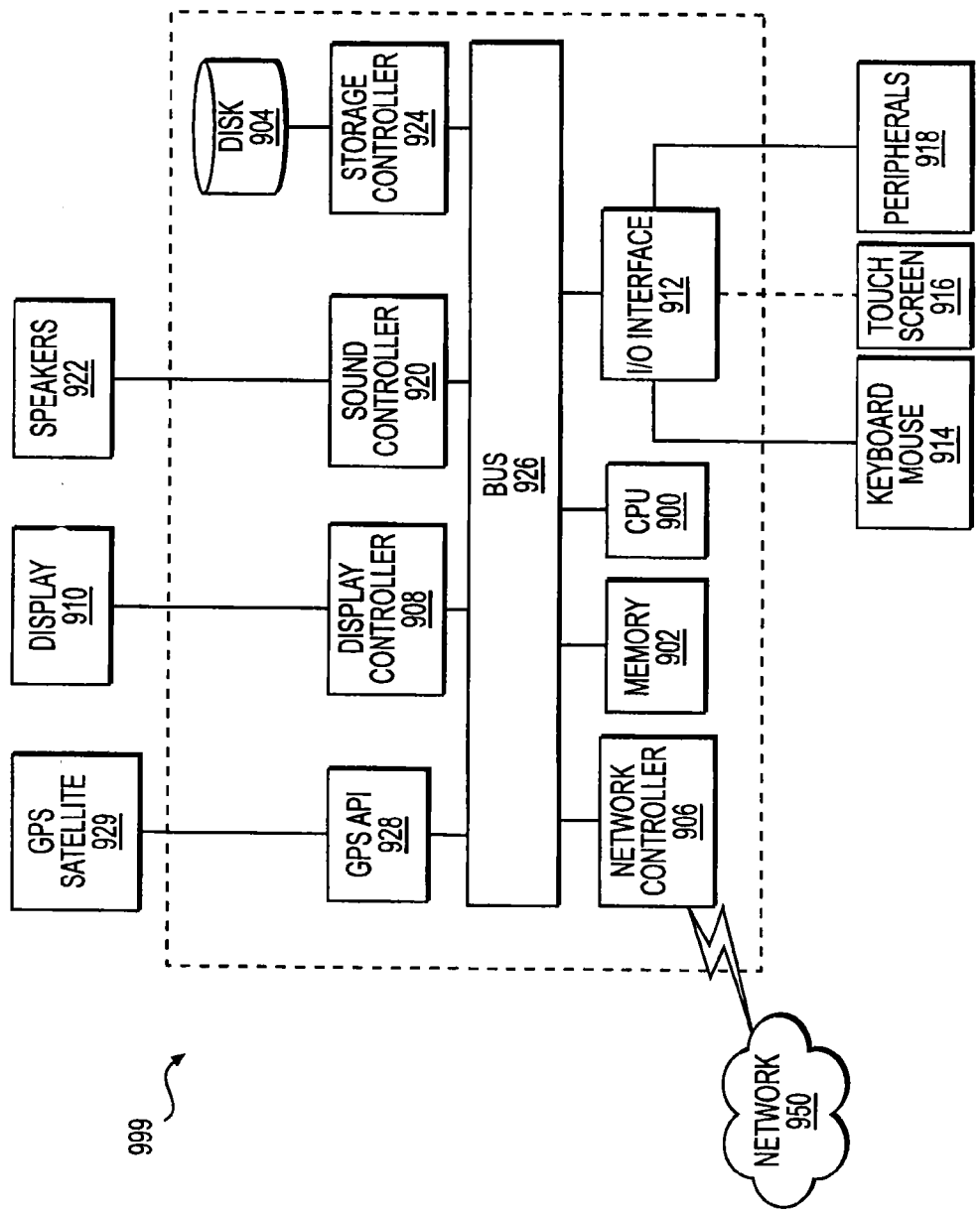
FIG. 9 illustrates a block diagram of a computing device according to an embodiment.

FIG. 9 illustrates a block diagram of a computing device according to an embodiment. The computer device may be configured to process satellite images of a region and categorize the sub-regions contained within the region into a class. Specifically, the computer may be programmed to compute a neighborhood quality index for each region and categorize it into one of very low, low, medium, high and very high as shown in FIG. 8.

In FIG. 9, the computer 999 includes a CPU 900 which performs the processes described above. The process data and instructions may be stored in memory 902. These processes and instructions may also be stored on a storage medium disk 904 such as a hard disk drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the system communicates, such as a server or computer.

Further, the claimed advancements may be provided as a utility application, background daemon, or component of an operating system, or combination thereof, executing in conjunction with CPU 900 and an operating system such as Microsoft Windows 7, UNIX, Solaris, LINUX, Apple MAC-OS and other systems known to those skilled in the art. CPU 900 may be a Xenon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The computer 999 in FIG. 9 also includes a network controller 906, such as an Intel Ethernet PRO network interface card from Intel Corporation of America, for interfacing with network 950. As can be appreciated, the network 950 can be a public network, such as the Internet, or a private network such as an LAN or WAN network, or any combination thereof and can also include PSTN or ISDN sub-networks. The network 950 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer 999 further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 may also be provided in the computer 999, such as Sound Blaster X-Fi Titanium from Creative, to interface with speakers/microphone 922 thereby providing sounds and/or music. The speakers/microphone 922 can also be used to accept dictated words as commands for controlling the robot-guided medical procedure system or for providing location and/or property information with respect to the target property.

The general purpose storage controller 924 connects the storage medium disk 904 with communication bus 926, which may be an ISA, EISA, VESA, PCI, or similar, for interconnecting all of the components of the robot-guided medical procedure system. A description of the general features and functionality of the display 910, keyboard and/or mouse 914, as well as the display controller 908, storage controller 924, network controller 906, sound controller 920, and general purpose I/O interface 912 is omitted herein for brevity as these features are known. Furthermore, the computer 999 includes a GPS interface 928 that is configured to communicate with the GPS satellite 929. The GPS controller 928 provisions for receiving high quality images from the GPS satellite 929 and further process the images to ascertain the neighborhood quality of the images region. Furthermore, the GPS interface 928 also allows for easy user calibration of the GPS satellite 929 and provisions for modifying the satellite system parameters based on the application under consideration.

While aspects of the present disclosure have been described in conjunction with the specific embodiments thereof that are proposed as examples, alternatives, modifications, and variations to the examples may be made. For instance, the above described techniques of monitoring a geographical region may be performed by a monitoring device that includes receiver antenna(s) to receive the satellite images of a geographical region. Further, the monitoring device also includes circuitry (i.e., processing circuit) that is configured to perform the steps of classification, object recognition, evaluation and monitoring and the like as described in the above embodiments. Accordingly, embodiments as set forth herein are intended to be illustrative and not limiting. There are changes that may be made without departing from the scope of the claims set forth below.

Furthermore, the above disclosure also encompasses the embodiments noted below.

(1) A method of evaluating and monitoring a geographical region using an image of the geographical region captured by a satellite, the method comprising: recognizing by circuitry, a plurality of objects within the captured image; computing by the circuitry, parameter values for a predetermined number of parameters based on boundaries of the recognized objects in the image; mapping, for each predetermined parameter, the parameter value to a first interval type-2 fuzzy set corresponding to the parameter; determining at least one rule from a plurality of rules that is activated based on the mapped parameter values to their corresponding first interval type-2 fuzzy sets; calculating by circuitry, for each activated rule, a second interval type-2 fuzzy set corresponding to a quality index of the geographical region; combining by circuitry, the calculated second interval type-2 fuzzy sets to obtain a third interval type-2 fuzzy set corresponding to an overall quality index of the geographical region; and monitoring the geographical region after a predetermined time interval to detect a change in the overall quality index of the geographical region.

(2) The method of evaluating and monitoring a geographical region of (1), further comprising: classifying by circuitry, each portion of the received image into one of a plurality of classes.

(3) The method of evaluating and monitoring a geographical region of (2), wherein the plurality of classes includes an agricultural area, a residential area, a forest area, and a water area.

(4) The method of evaluating and monitoring a geographical region of (2), wherein the classifying step further includes classifying the portions of the received image based on a radiometric signature of the image portion that is captured by a heat sensor.

(5) The method of evaluating and monitoring a geographical region of (1), wherein the plurality of recognized objects include houses and streets in the geographical region and the predetermined parameters include street width, house size, and number of houses in the geographical region.

(6) The method of evaluating and monitoring a geographical region of (1), wherein the computed parameter value for each predetermined parameter is categorized into one of a low category, a medium category and a high category.

(7) The method of evaluating and monitoring a geographical region of (6), wherein each categorized parameter value is mapped to a corresponding interval type-2 fuzzy set that is defined by a predetermined membership function.

(8) The method of evaluating and monitoring a geographical region of (1), wherein the second interval type-2 fuzzy set is calculated by performing a minimum triangular-norm operation on the first interval type-2 fuzzy sets corresponding to the predetermined parameters.

(9) The method of evaluating and monitoring a geographical region of (1), wherein the third interval type-2 fuzzy set is obtained by performing a maximum triangular-norm operation on the second interval type-2 fuzzy sets.

(10) The method of evaluating and monitoring a geographical region of (1), further comprising: reducing by circuitry, the third interval type-2 fuzzy set to an interval type-1 fuzzy set based on a plurality of computed centroids of the third interval type-2 fuzzy set; and transforming the interval type-1 fuzzy set to a number that corresponds to the quality index of the geographical region, by computing a centroid of the interval type-1 fuzzy set.

(11) The method of evaluating and monitoring a geographical region of (1), wherein the predetermined time interval corresponds to a time interval between successive satellite image captures.

(12) A device to evaluate and monitor a geographical region by using an image of the geographical region captured by a satellite, the device comprising: circuitry configured to:
recognize a plurality of objects within the captured image; compute parameter values for a predetermined number of parameters based on boundaries of the recognized objects in the image; map, for each predetermined parameter, the parameter value to a first interval type-2 fuzzy set corresponding to the parameter; determine at least one rule from a plurality of rules that is activated based on the mapped parameter values to their corresponding first interval type-2 fuzzy sets; calculate, for each activated rule, a second interval type-2 fuzzy set corresponding to a quality index of the geographical region; combine the calculated second interval type-2 fuzzy sets to obtain a third interval type-2 fuzzy set corresponding to an overall quality index of the geographical region; and monitor the geographical region after a predetermined time interval to detect a change in the overall quality index of the geographical region.

(13) The device of (12), wherein the circuitry is further configured to: classify each portion of the received image into one of a plurality of classes.

(14) The device of (13), wherein the circuitry is configured to classify the portions of the received image based on a radiometric signature of the image portion that is captured by a heat sensor.

(15) The device of (12), wherein the plurality of recognized objects include houses and streets in the geographical region and the predetermined parameters include street width, house size, and number of houses in the geographical region.

(16) The device of (12), wherein the second interval type-2 fuzzy set is calculated by performing a minimum triangular-norm operation on the first interval type-2 fuzzy sets corresponding to the predetermined parameters and the third interval type-2 fuzzy set is obtained by performing a maximum triangular-norm operation on the second interval type-2 fuzzy sets.

(17) The device of (12), wherein the circuitry is further configured to: reduce the third interval type-2 fuzzy set to an interval type-1 fuzzy set based on a plurality of computed centroids of the third interval type-2 fuzzy set; and transform the interval type-1 fuzzy set to a number that corresponds to the quality index of the geographical region, by computing a centroid of the interval type-1 fuzzy set.

(18) A non-transitory computer-readable medium having stored thereon computer-readable instructions that, when executed by a computer, causes the computer to execute a method of evaluating and monitoring a geographical region using an image of the geographical region captured by a satellite, the method comprising: recognizing a plurality of objects within the captured image; computing parameter values for a predetermined number of parameters based on boundaries of the recognized objects in the image; mapping, for each predetermined parameter, the parameter value to a first interval type-2 fuzzy set corresponding to the parameter; determining at least one rule from a plurality of rules that is activated based on the mapped parameter values to their corresponding first interval type-2 fuzzy sets; calculating, for each activated rule, a second interval type-2 fuzzy set corresponding to a quality index of the geographical region; combining the calculated second interval type-2 fuzzy sets to obtain a third interval type-2 fuzzy set corresponding to an overall quality index of the geographical region; and monitoring the geographical region after a predetermined time interval to detect a change in the overall quality index of the geographical region.

(19) The non-transitory computer readable medium of (18), wherein the method further comprises: reducing the third interval type-2 fuzzy set to an interval type-1 fuzzy set based on a plurality of computed centroids of the third interval type-2 fuzzy set; and transforming the interval type-1 fuzzy set to a number that corresponds to the quality index of the geographical region, by computing a centroid of the interval type-1 fuzzy set.

(20) The non-transitory computer readable medium of (18), wherein the second interval type-2 fuzzy set is calculated by performing a minimum triangular-norm operation on the first interval type-2 fuzzy sets corresponding to the predetermined parameters and the third interval type-2 fuzzy set is obtained by performing a maximum triangular-norm operation on the second interval type-2 fuzzy sets.

The invention claimed is:
1. A method of evaluating and monitoring a geographical region using an image of the geographical region captured by a satellite, the method comprising:
recognizing by circuitry, a plurality of houses, and a plurality of streets within the captured image, each house being recognized based on a geometry of an object corresponding to a house, and each street being recognized based on a distance between edges of two recognized houses;
computing by the circuitry, a first parameter associated with each house, a second parameter associated with the plurality of houses, and a third parameter associated with the plurality of streets, the first parameter being a size of the house that is computed based on the geometry of the object corresponding to the house, the second parameter being a magnitude of the plurality of houses being recognized in the captured image, and the third parameter being the distance between edges of two recognized houses;
mapping, the computed first, second, and third parameters, respectively, to a first interval type-2 fuzzy set, each computed parameter being mapped to one level of a first predetermined number of levels of the first interval type-2 fuzzy set;
determining at least one rule from a plurality of rules that is activated based on the mapping of the first, second, and third parameters to their corresponding first interval type-2 fuzzy sets;

calculating by circuitry, for each activated rule, a second interval type-2 fuzzy set corresponding to the geographical region, the second interval type-2 fuzzy set having a computed value that is one level of a second predetermined number of levels;

combining by circuitry, the calculated second interval type-2 fuzzy sets to obtain a third interval type-2 fuzzy set corresponding to an overall quality index parameter of the geographical region, the overall quality index parameter corresponding to comparison of each of a magnitude of the size of each house in the captured image, the number of houses being recognized in the captured image, and the magnitude of the street width in the captured image with respective threshold values, the combining including computing a union of the calculated second interval type-2 fuzzy sets and computing a weighted average of membership functions corresponding to each of the calculated second interval type-2 fuzzy sets; and monitoring the geographical region after a predetermined time interval to detect a change in the overall quality index parameter of the geographical region.

2. The method of evaluating and monitoring a geographical region of claim 1, further comprising:
classifying by circuitry, each portion of the received image into one of a plurality of classes.

3. The method of evaluating and monitoring a geographical region of claim 2, wherein the classifying step further includes classifying the portions of the received image based on a radiometric signature of the image portion that is captured by a heat sensor.

4. The method of evaluating and monitoring a geographical region of claim 1, wherein each of the first, second, and third parameter is categorized into one of a low category, a medium category and a high category.

5. The method of evaluating and monitoring a geographical region of claim 4, wherein each categorized parameter value is mapped to a corresponding interval type-2 fuzzy set that is defined by the membership functions.

6. The method of evaluating and monitoring a geographical region of claim 1, wherein the second interval type-2 fuzzy set is calculated by performing a minimum triangular-norm operation on the first interval type-2 fuzzy sets corresponding to the parameters.

7. The method of evaluating and monitoring a geographical region of claim 1, wherein the third interval type-2fuzzy set is obtained by performing a maximum triangular-norm operation on the second interval type-2 fuzzy sets.

8. The method of evaluating and monitoring a geographical region of claim 1, further comprising:
reducing by circuitry, the third interval type-2 fuzzy set to an interval type-1 fuzzy set based on a plurality of computed centroids of the third interval type-2 fuzzy set; and
transforming the interval type-1 fuzzy set to a number that corresponds to the overall quality index parameter of the geographical region, by computing a centroid of the interval type-1 fuzzy set.

9. The method of evaluating and monitoring a geographical region of claim 1, wherein the predetermined time interval corresponds to a time interval between successive satellite image captures.

10. The method of claim 1, wherein the second interval type-2 fuzzy set is categorized into one of a very low level, a low level, a medium level, a high level, and a very high level.

11. A device to evaluate and monitor a geographical region by using an image of the geographical region captured by a satellite, the device comprising:
circuitry configured to:
recognize a plurality of houses, and a plurality of streets within the captured image, each house being recognized based on a geometry of an object corresponding to a house, and each street being recognized based on a distance between edges of two recognized houses,
compute a first parameter associated with each house, a second parameter associated with the plurality of houses, and a third parameter associated with the plurality of streets, the first parameter being a size of the house that is computed based on the geometry of the object corresponding to the house, the second parameter being a magnitude of the plurality of houses being recognized in the captured image, and the third parameter being the distance between edges of two recognized,
map, the computed first, second, and third parameters, respectively, to a first interval type-2 fuzzy set, each computed parameter being mapped to one level of a first predetermined number of levels of the first interval type-2 fuzzy set,
determine at least one rule from a plurality of rules that is activated based on the mapping of the first, second, and third parameters to their corresponding first interval type-2 fuzzy sets,
calculate, for each activated rule, a second interval type-2 fuzzy set corresponding to the geographical region, the second interval type-2 fuzzy set having a computed value that is one level of a second predetermined number of levels,
combine the calculated second interval type-2 fuzzy sets to obtain a third interval type-2 fuzzy set corresponding to an overall quality index parameter of the geographical region, the overall quality index parameter being obtained based on a comparison of each of a magnitude of the size of each house in the captured image, the number of houses being recognized in the captured image, and the magnitude of the street width in the captured image with respective threshold values, the combining including computing a union of the calculated second interval type-2 fuzzy sets and computing a weighted average of membership functions corresponding to each of the calculated second interval type-2 fuzzy sets, and
monitor the geographical region after a predetermined time interval to detect a change in the overall quality index parameter of the geographical region.

12. The device of claim 11, wherein the circuitry is further configured to:
classify each portion of the received image into one of a plurality of classes.

13. The device of claim 12, wherein the circuitry is configured to classify the portions of the received image based on a radiometric signature of the image portion that is captured by a heat sensor.

14. The device of claim 11, wherein the second interval type-2 fuzzy set is calculated by performing a minimum triangular-norm operation on the first interval type-2 fuzzy sets corresponding to the parameters and the third interval type-2 fuzzy set is obtained by performing a maximum triangular-norm operation on the second interval type-2 fuzzy sets.

15. The device of claim 11, wherein the circuitry is further configured to:
reduce the third interval type-2 fuzzy set to an interval type-1 fuzzy set based on a plurality of computed centroids of the third interval type-2 fuzzy set; and
transform the interval type-1 fuzzy set to a number that corresponds to the overall quality index parameter of the geographical region, by computing a centroid of the interval type-1 fuzzy set.

16. A method of evaluating and monitoring a region using an image of the region captured by a satellite, the method comprising:
classifying by circuitry, each portion of the received image into one of a plurality of classes, the classification being performed based on a radiometric signature of the image portion that is captured by a heat sensor;
recognizing by circuitry, a plurality of houses, and a plurality of streets within the captured image, each house being recognized based on a geometry of an object corresponding to a house, and each street being recognized based on a distance between edges of two recognized houses;
computing by the circuitry, a first parameter associated with each house, a second parameter associated with the plurality of houses, and a third parameter associated with the plurality of streets, the first parameter being a size of the house that is computed based on the geometry of the object corresponding to the house, the second parameter being a magnitude of the plurality of houses being recognized in the captured image, and the third parameter being the distance between edges of two recognized houses;
mapping, the computed first, second, and third parameters, respectively, to a first interval type-2 fuzzy set, each computed parameter being mapped to one level of a first predetermined number of levels of the first interval type-2 fuzzy set;
determining at least one rule from a plurality of rules that is activated based on the mapping of the first, second, and third parameters to their corresponding first interval type-2 fuzzy sets;
calculating by circuitry, for each activated rule, a second interval type-2 fuzzy set corresponding to the region, the second interval type-2 fuzzy set having a computed value that is one level of a second predetermined number of levels, the second interval type-2 fuzzy set being calculated by performing a minimum triangular-norm operation on the first interval type-2 fuzzy sets;
combining by circuitry, the calculated second interval type-2 fuzzy sets to obtain a third interval type-2 fuzzy set corresponding to an overall quality index parameter of the region, the overall quality index parameter corresponding to comparison of each of a magnitude of the size of each house in the captured image, the number of houses being recognized in the captured image, and the magnitude of the street width in the captured image with respective threshold values, the combining including computing a union of the calculated second interval type-2 fuzzy sets and computing a weighted average of membership functions corresponding to each of the calculated second interval type-2 fuzzy sets; and
monitoring the region after a predetermined time interval to detect a change in the overall quality index parameter of the region.

17. The method of claim 16, further comprising:
reducing the third interval type-2 fuzzy set to an interval type-1 fuzzy set based on a plurality of computed centroids of the third interval type-2 fuzzy set; and
transforming the interval type-1 fuzzy set to a number that corresponds to the overall quality index parameter of the region, by computing a centroid of the interval type-1 fuzzy set.

18. The method of claim 16, wherein the second interval type-2 fuzzy set is calculated by performing a minimum triangular-norm operation on the first interval type-2 fuzzy sets corresponding to the parameters and the third interval type-2 fuzzy set is obtained by performing a maximum triangular-norm operation on the second interval type-2 fuzzy sets.

\* \* \* \* \*